United States Patent

Jacob

[15] 3,674,938

[45] July 4, 1972

[54] EXPANDED MULTI-STAGE TIME CONNECTION NETWORK

[72] Inventor: Jean-Baptiste Jacob, Saint-Quay Perros, France

[73] Assignees: C.I.T.-Compagnie Industrielle Des Telecommunications, Paris, France; Societe Lannionaise D'Electronique, Lannion, France

[22] Filed: Dec. 29, 1970

[21] Appl. No.: 102,371

[30] Foreign Application Priority Data

Dec. 29, 1969 France ..................................6945219

[52] U.S. Cl. .......................................179/15 AQ, 340/166 R

[51] Int. Cl. .........................................H04j 3/08, H04q 3/42

[58] Field of Search ........................179/15 AQ, 15 AT, 18 J; 340/166

[56] References Cited

UNITED STATES PATENTS 3,461,242 8/1969 Inose et al. .........................179/15 AQ 3,492,430 1/1970 Vigliante ...........................179/15 AT

*Primary Examiner*—Donald J. Yusko

*Attorney*—Craig, Antonelli & Hill

[57] ABSTRACT

Time connection network consisting of two identical networks, each input switch of a network being connected to the intermediate switches, each intermediate switch comprising two assemblies consisting of input registers and a buffer memory, each assembly being connected to a control memory and to the same output registers.

8 Claims, 2 Drawing Figures

INVENTOR
JEAN-BAPTISTE JACOB
By Craig, Antonelli, Stewart & Hill
ATTORNEYS

INVENTOR
JEAN-BAPTISTE JACOB

By Craig, Antonelli, Stewart & Hill
ATTORNEYS

EXPANDED MULTI-STAGE TIME CONNECTION NETWORK

The present invention relates to a large-capacity time connection network usable particularly in automatic telephone switching, and more generally in the industries of telecommunications, telecontrol, telesignalling, etc.

Known in the art are non-blocking time connection networks, such as the network disclosed in my copending U.S. Pat. application No. 39,786, filed May 22, 1970, including time switches with $n$ incoming network lines and m outgoing network lines, each network line containing x time channels of $y$ binary elements, for example, 32 time channels of 8 binary elements. Also known from the aforementioned patent application is a time connection network comprising three stages, namely, one input stage, one intermediate stage, and one output stage, and this network has $n^2$ incoming time network lines, and $n^2$ outgoing time network lines allowing for the connection or linkage between any one time channel of the $n^2$ input network lines and any one time channel of the $n^2$ output network lines; and the traffic may be assured either without blocking or with blocking, according to the number $m$ of the circuit breakers provided in the intermediate stage.

It is thus possible to obtain, with a connection network having three stages, a network of $32 \times = 1024$ incoming and outgoing network lines, thereby allowing for the access of $1024 \times 32$ circuits, or about 32,000 circuits. In the case of a non-blocking arrangement, such a system provides for the installation of 16,000 complete conversation circuits. In order to obtain a network comprising more than 32,000 circuits, it is only necessary to increase the number of stages of the network to five stages, which then gives a possibility of handling $n^3$ network lines, or about 1 million circuits. It is readily conceivable that a network of such capacity is not practical and the cost thereof is ill justified when one merely wants to double the capacity of a network having a 32,000 circuit capacity, since a network with $n^3$ lines, or five stages, has a greatly higher per circuit cost than a network with three stages.

The present invention is directed to and concerned with the extension of the capacity of a connection network having $n^2$ lines, making it possible to obviate the disadvantages and drawbacks pertaining to the cost and the complexity of expanding such a network into a connection network with $n^3$ network lines. More particularly, it envisages doubling the capacity of the network having $n^2$ network lines.

The present invention relates to a time connection network comprising an input stage, an intermediate stage and an output stage, each stage consisting of a certain number of time switches, characterized by the fact that it consists of first and second networks which are identical to each other and each have $n^2$ incoming network lines and $n^2$ outgoing network lines, each intermediate switch of the first and of the second networks having a double number of input registers and buffer memories, and the control memory comprising an additional binary element per word. Each output register of an input switch of one network is also connected to the corresponding additional input register of the corresponding intermediate switch of the other network, the additional input registers of one intermediate switch being connected to the additional buffer memory of the aforementioned intermediate switch, and the aforementioned memory being connected to the control memory as well as to the output registers of the intermediate switch.

The characteristics of the connection network as proposed by the present invention will be better understood on the basis of the following detailed description of one embodiment thereof, given solely for purposes of example, and with the aid of the accompanying drawings, wherein:

FIG. 1 is a schematic diagram of a connection network R having three stages and two $n^2$ network lines consisting of two networks $R_1$ and $R_2$ with $n^2$ network lines each, and consisting of one input stage EE, one intermediate stage EI, and one output stage ES.

The input stage of the network $R_1$ comprises n switches $C_1E_1$ to $C_1E_n$; the input stage of the network $R_2$ comprises $n$ switches $C_2E_1$ to $C_2E_n$. The intermediate stage of the network $R_1$ comprises $n$ principal switches $C_1I_1$ to $C_1I_n$ and n auxiliary switches $C_1I'_1$ to $C_1I'_n$, these switches having the same outputs as those of the corresponding principal circuit breakers. The intermediate stage of the network $R_2$ comprises n principal switches $C_2I_1$ to $C_2I_n$ and n auxiliary switches $C_2I'_1$ to $C_2I'_n$, these switches having the same outputs as those of the corresponding principal switches. The output stage of the network $R_1$ comprises $n$ switches $C_1S_1$ to $C_1S_n$; the output stage of the network $R_2$ comprises n switches $C_2S_1$ to $C_2S_n$.

The outputs of the input switches of the network $R_1$ are connected to the inputs of the principal intermediate switches of the network $R_1$ as well as to the inputs of the auxiliary intermediate switches of the network $R_2$; just as the outputs of the input switches of the network $R_2$ are connected to the inputs of the principal intermediate switches of the network $R_2$, as well as to the inputs of the auxiliary intermediate switches of the network $R_1$. In a general fashion, the connections or linkages between the output registers of $C_1E_1$ to $C_1E_n$ with respect to the input registers of switches $C_1I_1$ to $C_1I_n$ are as disclosed in my copending application referred to hereinabove; and the same holds true for the connections or linkages between switches $C_1E_1$ to $C_1E_n$ and $C_2I'_1$ to $C_2I'_n$, for the connections between $C_2E_1$ to $C_2I_n$ to with $C_2I_1$ to $C_2I_n$ and for the connections between $C_2E_1$ to $C_2E_n$ with $C_1I'_1$ to $C_1I'_n$. The connections between the intermediate switches and the output switches do not pose any problem; the outgoing network lines of the switches $C_1I_1$ to $C_1I_n$ and $C_2I_1$ to $C_2I_n$ are common to the auxiliary switches $C_1$ $I'_1$ to $C_1I'_n$ and $C_2I'_1$ to $C_2I'_n$, and the linkages or connections are made in accordance with the aforementioned patent application.

In this example, all of the switches have a square configuration; they each have $n$ inputs and n outputs. But the present invention is not limited to this single case and is applicable in a general fashion to any network whose p input switches have $n$ incoming network lines and $m$ outgoing network lines, which necessitates the use of $m$ intermediate switches having $p$ incoming lines and $p$ outgoing lines; the output switches being $p$ in number having $m$ incoming lines and $n$ outgoing lines.

Figure 1:
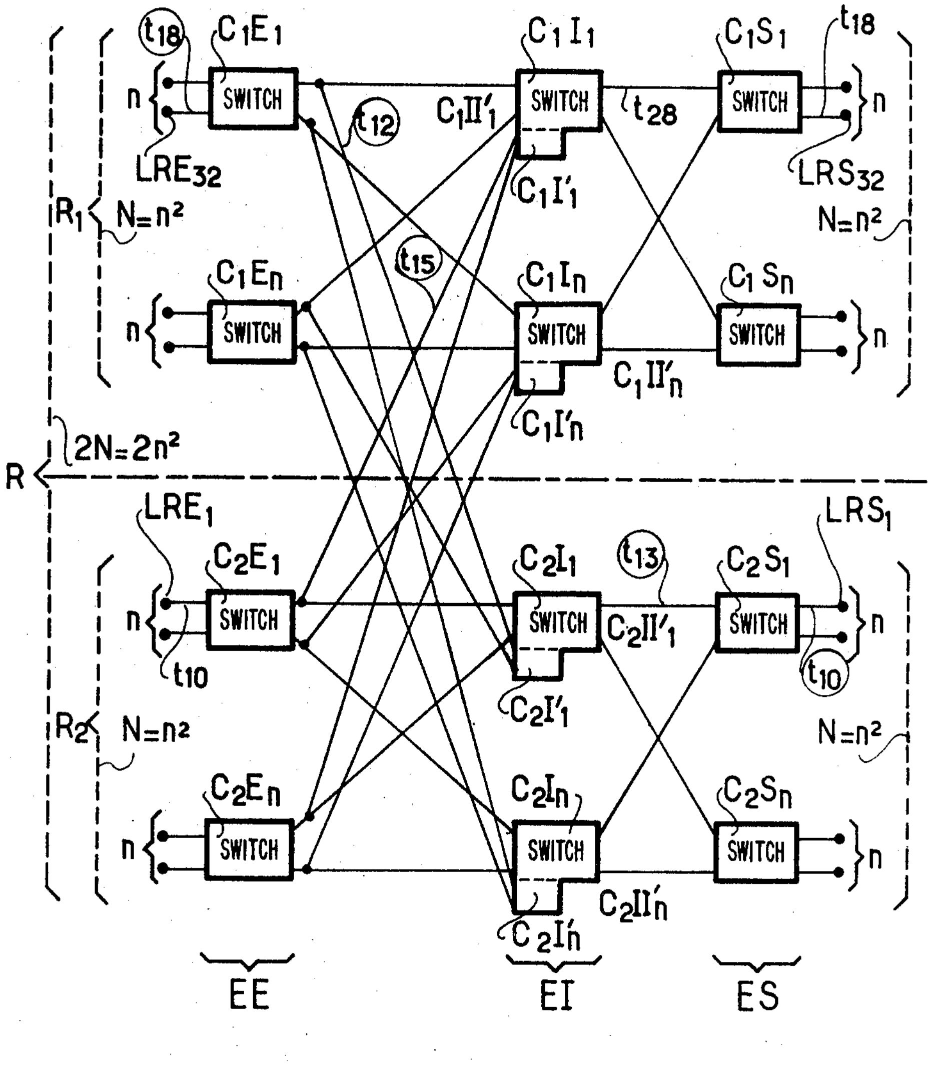
FIG. 1 is a schematic representation of a time connection network having three stages, according to the present invention.
Figure 2:
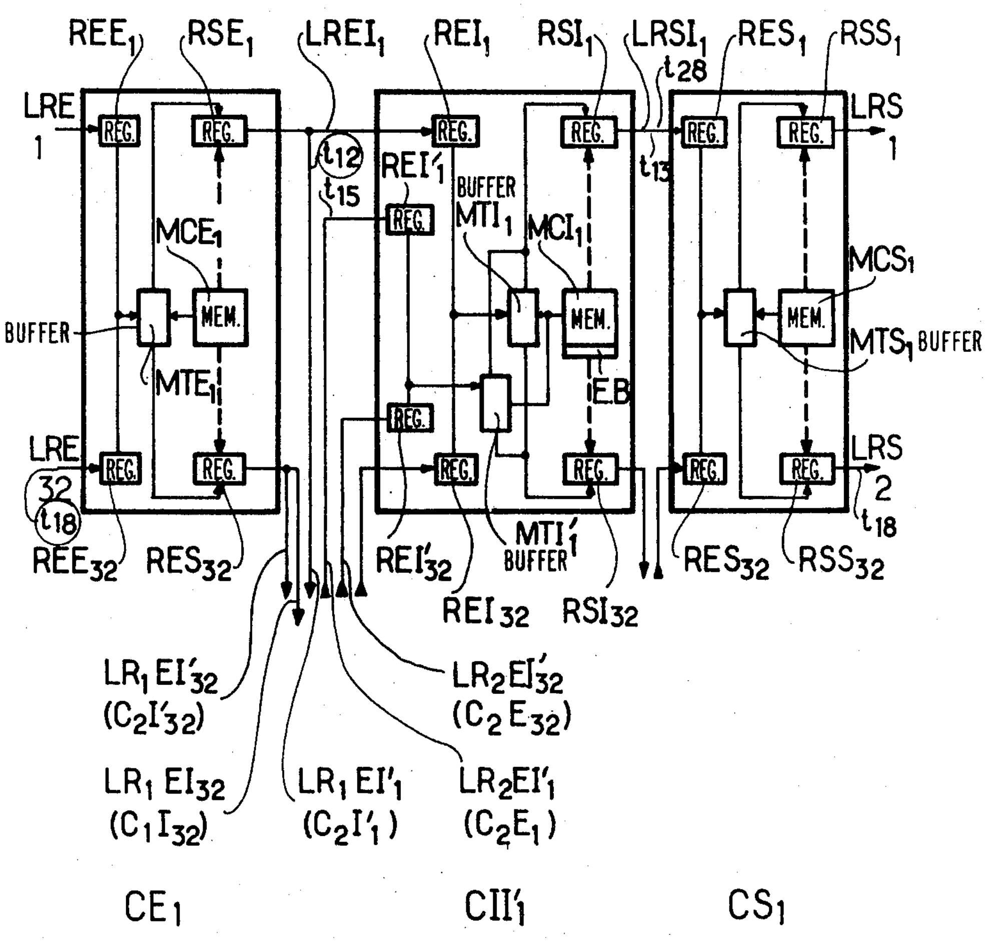
FIG. 2 illustrates schematically a time connection network as proposed by the present invention, showing the principal constituents of the time switches.

FIG. 2 shows by way of example, and without being limiting, three time switches of a connection network R with three stages, such as shown in FIG. 1 and showing the detailed configuration thereof. It is assumed that each time switch, whether it be an input switch such as $CE_1$, an output switch such as $C_1S_1$, or an intermediate switch such as $C_1I_1$ or $CII'_1$, comprises 32 incoming network lines and 32 outgoing network lines; accordingly, square switches are thus involved here.

Disposed in the input switch $C_1E_1$ are 32 input registers $REE_1$, $REE_2$ . . . $REE_{32}$ in which terminate respectively the input network lines $LRE_1$, $LRE_2$ . . . $LRE_{32}$. A buffer memory $MTE_1$ is also provided consisting of 32 blocks or elementary memories each comprising 32 words of eight binary elements; the elementary memories are addressable memories, and it will be assumed in accordance with the invention that static addressable memories are involved here. A control memory $MCE_1$ is provided comprising 1,024 words like the buffer memory, but having 10 binary elements and allowing for addressing one word among 1,024. These 1,024 words also constitute 32 blocks of 32 words, one block being associated with one output register. The control memories may be of two types, namely, either addressable or with circulation word per word (parallel series memory of 1,024 words of ten binary elements). Thirty-two output registers $RSE_1$, $RSE_2$ . . . $RSE_{32}$ are provided from which extend thirty-two intermediate network lines $LREI_1$, $LREI_2$ . . . $LREI_{32}$, respectively toward the corresponding input registers of the intermediate switches $C_1I_1$ to $C_1I_{32}$ and switches $C_2I_1$ to $C_2I_{32}$ of the intermediate stage. These connections or linkages between the output registers of switch $C_1E_1$ and the input registers of switches $C_1I_1$ to $C_1I_{32}$ and $C_2I'_1$ to $C_2I'_{32}$ are made in accordance with the aforementioned patent application.

In a manner similar to the input switch $C_1E_1$, one finds on the switches $C_1I'_1$ and $C_1S_1$ analogous elements; thus, the input registers $REE_1$ to $REE_{32}$ are respectively replaced by the registrs $REI_1$ to $REI_{32}$ for the switch $CI_1$ and $REI'_1$ to $REI'_{32}$ for $C_1I'_1$ and by the registers $RES_1$ to $RES_{32}$ for the switches $C_1S_1$; likewise, the buffer memory MTE is replaced by the buffer memory $MTI_1$ for the switch $C_1I_1$ and $MTI'_1$ for $C_1I'_1$ and by the buffer memory $MTS_1$ for the switch $C_1S_1$ etc., . . . and an identical structure is found in each of the switches $C_1E_1$, $C_1I'_1$ and $C_1S_1$.

In addition to this identical structure, one finds in the intermediate switch $C_1I'_1$, in addition to the input registers $REI'_1$ to $REI'_{32}$ which are identical to the other registers, a buffer memory $MTI'_1$ which is associated with these registers and depends like the buffer memory $MTI_1$ upon the control memory $MCI_1$ to which there has been added one additional binary element per word, or for a memory of 1,024 words 1,024 additional binary elements designated as E.B., each additional binary element making it possible to determine to which buffer memory, $MTI_1$ or $MTI1_1$, the marked or registered word is associated.

There is also found, starting from each output register of the input switch, one incoming network line for one intermediate switch of the network $R_2$ of FIG. 1; thus, from the register $RSE_1$ originates a network line $LR_1EI'_1$ terminating at the first input register of the intermediate switch $C_2I'_1$; likewise from the register $RSE_{32}$ there originates a network line $LR_1EI'_{32}$ terminating at the 32 input register of the intermediate switch $C_2I'_{32}$. In addition, the input register $REI'_1$ of the intermediate switch $C_1I'_1$ is connected by means of the network line $LR_2EI'_1$ of the intermediate switch $C_1I'_1$, the input register $REI'_{32}$ being linked to the first register of the switch $C_2E_n$.

The principle of establishing a connection between an incoming network line and an outgoing network line in a time connection network with stages such as $R_1$ or $R_2$ in FIG. 1 has been described in the aforementioned patent application. The principal of establishing a connection between an incoming network line of the network $R_2$ and an outgoing network line of the network $R_1$ in a time connection network with R stages according to the present invention, as shown in FIG. 1, is as follows.

It is assumed that the choice of the incoming network line and of the outgoing network line is made by means of members outside of the network, in practice such marking of a selected input and selected output is performed by means of selection units. The number of the time channel of the incoming network line and the number of the time channel of the outgoing network line are also assumed to be chosen by the selection units.

If one considers first of all a time switch such as $C_1E_1$ (FIG. 2) for purposes of establishing a connection between a time channel *ti* of an input register, for example, $REE_1$, and a time channel *tj* of an output register, for example $RSE_1$, it suffices to write in a word of 10 b.e. in the control memory MCE associated with the time channel *tj* of the output register $RSE_1$, the address of the word of the buffer memory $MTE_1$ associated with the time channel *ti* of the input register $REE_1$. In fact, there are associated with each input register of a circuit breaker 32 words of the buffer memory corresponding to the 32 time channels, and associated with each output register are 32 words of the control memory. In this fashion, the address written in the control memory makes it possible to read in the buffer memory the information emitted at the input and for transferring it into the output register, and thus for establishing a time connection. If one now considers a connection network with three stages such as shown in FIG. 1, a connection between a time input channel of the network $R_2$ and a time output channel of the network $R_1$ is established with the aid of three connections: one connection in an input switch; one connection in an intermediate switch, and one connection in an output switch. It is obviously necessary that the output of the input switch whose output must inturn correspond to the input of the output switch.

A numerical example of a connection through a network with three stages will be given with reference to FIGS. 1 and 2.

It is assumed that the input of the connection network consists of the time channel $t_{10}$ of the network line $LRE_1$ of the input switch $C_2E_1$ and that the output of the connection network consists of the time channel $t_{18}$ of the network line $LRS_{32}$ of the output switch C $C_1S_1$.

The intermediate switch $C_1I'_1$ is utilized and in this switch a time channel of the input register $REI'_1$ and a time channel or path of the output register $RSI_1$ is used, for example, the time channels $t_{15}$ and $t_{28}$, respectively. It follows that the time channels $t_{15}$ of the register $RSE_1$ of the switch $C_2E_1$ and 28 of the register $RES_1$ of the switch $C_1S_1$ will also be utilized.

The complete connection is made by recording or storing certain data. In the switch $C_2E_1$, there is recorded in the control memory $MCE_1$ and in word No. 15 of the block of 32 words associated with $RSE_1$ the address of word No. 10 of the block of 32 buffer words associated with $REE_1$. In the switch $C_1I'_{1a}$, there is recorded in the control memory $MCI_1$ and in word No. 28 of the block of 32 words associated with RSI of the address of word No. 15 the block of 32 buffer words associated with $REI'_1$ as well as in b.e. of the address of the buffer memory $MTI'_1$ associated with $REI'_1$, that is to say, to position at "1" the additional *b.e.* of word No. 28 of the block of 32 words associated with $RSI_1$ and in $MCI_1$. In the output switch $C_1S_1$, there is recorded in the control memory $MCS_1$ and in word No. 18 ($t_{18}$) of the block of 32 words associated with $RSS_{32}$, the address of word No. 28 of the block of 32 buffer words associated with $RES_1$.

It will be noted that, since there takes place in a time switch the transfer from an input toward the output connected to each sampling period T, three periods T will be required to transfer an information from an input to an output of a time network having three stages.

The installation of a telephone time communication necessitates two connections through a connection network, namely, one from the subscribing caller to the subscriber being called, and the other from the subscriber being called toward the subscribing caller. These two connections are obviously not independent from each other; as a matter of fact, since the subscriber modulation equipment is sampled at the same time "emission side" and "receiving side," the coded signal to be emitted by a subscriber toward his correspondent and the coded signal to be received by the correspondent must be present at the same time in the modulation equipment of the subscriber. Hence, the number of the sampling time channel of a subscribing caller determines the time channel number on the incoming network line (LRE) of the caller connection toward the person being called as well as the time channel number on the outgoing network line (LRS) of the connection from the person called toward the person calling. It is understood that, if the delays of transmission between the connection network and the subscriber modulation equipment were nil, the two time channels would have the same number, and this is what has been assumed in the numerical example which will be given hereinbelow; in fact, there is a constant difference between the time channel on LRE and the time channel on LRS in the two directions of the connection in a manner such that, when one of the time channels is known, the other is readily deduced therefrom by either addition or subtraction of a constant.

The numerical example given hereinabove concerning the connection through a connection network having three stages corresponds to the connection of caller toward the person called; this example will be completed by the connection from a person called to the caller. This latter connection will be established between the time channel $t_{18}$ of $LRE_{32}$ (FIG. 1) of the switch $C_1E_1$ and the time channel $t_{10}$ of $LRS_1$ of the switch $C_2S_1$. The intermediate switch $C_2I'_1$ will be utilized and in this switch the time channel $t_{12}$ of $REI'_1$ and the time channel $t_{13}$ of $RSI_1$, for example, by assuming that these time channels be not occupied (these time channels will be shown encircled in FIGS. 1 and 2).

The connection is made by recording or storing data as indicated hereinafter. In the switch $C_1I_1$, there is recorded in the control memory $MCE_1$ and in word No. 12 of the block of 32 words associated with $RSE_1$, the address of word No. 18 of the block of 32 buffer words associated with $REE_{32}$. In the switch $C_2I'_{1a'}$ there is recorded in the control memory $MCI_1$ and in word No. 13 of the block of 32 words associated with $RSI_1$, the address of word No. 12 of the block of 32 buffer words associated with $REI'_1$, as well as in *b.e.* of the address of the buffer memory $MTI'_1$ associated with $REI'_1$. In the switch $C_2S_1$, there is recorded in the control memory $MCS_1$ and in word No. 10 of the block of 32 words associated with $RSS_1$, the address of word No. 13 of the block of 32 buffer words associated with $RES_1$.

It is understood that the operation as described hereinabove which allows for connecting a subscribing caller of the network $R_2$ (FIG. 1) to a subscriber being called in network $R_1$ may be easily transposed if the subscribing caller should belong to network $R_1$ and the subscriber being called belongs to network $R_2$.

In a network comprising stages such as described above, the fact that it is possible to send sounds or signals at voice frequencies brings into play only the output switches CS. It is assumed that the number of signals and sounds is smaller than 32 and that these signals are available in the form of coded modulation in the form of impulses (MCI), such as speech signals, at the input of the connection network, and that they are furnished by a member outside of the network. Each output switch CS will then dispose of a 33 incoming network line, that is to say, of a 33 register $RES_{33}$ and a 33 buffer memory block of 32 words in which there are recorded at each sampling period successive and periodic codes of the 32 signals at vocal frequencies.

In order to send a sound or signal $j$ to a subscriber being connected to an output register $RSS_n$ during a time channel $ti$, it will be sufficient to inscribe or record in the control memory of the switch at the word No. $i$ of the block No. $n$ of the 32 words being associated with the resister $RSS_n$, the number of $j$ of the buffer memory word that is affected or influenced at this sound in the block of the 32 words associated with the register $RES_{33}$.

It is understood that the present invention is by no means limited to the embodiment thereof which has been described and shown herein, which has been given solely by way of example. More particularly, it is possible to modify certain provisions thereof or to exchange certain means for equivalent means without departing from the spirit and scope of the present invention.

What is claimed is:

1. A time division multiplex connection system comprising at least a pair of stage networks each including at least one input stage, an intermediate stage and an output stage, each stage being formed of a certain number of time switches each having a certain number of incoming network lines and a certain number of outgoing network lines, time division multiplex connections between the outgoing lines of said input stage and the incoming lines of said intermediate stage and between the outgoing lines of said intermediate stage and the incoming lines of said output stage, each incoming line and each outgoing line comprising several time channels and each time channel comprising several time slots, each time switch of an input stage of one network being connected also to the incoming lines of the intermediate stage of the other network so that any one time channel of any one input switch can be connected to any one time channel of any one output switch in either network.

2. A time division multiplex connection system as defined in claim 1, wherein each switch is composed of input means receiving said several time channels on said incoming lines, output means applying said several time channels on said outgoing lines and memory means for transferring said time channels from said input means to said output means.

3. A time division multiplex connection system as defined in claim 2, wherein said memory means includes control means for transferring a given time channel on one input line to a different time channel on an output line of the associated switch.

4. A time division multiplex connection system as defined in claim 2, wherein each network comprises only three stages, an input stage comprising $p$ input switches with $n$ inputs and $m$ outputs, an intermediate stage comprising two $m$ intermediate switches with $p$ inputs and $q$ outputs, an output stage comprising $q$ output switches with $m$ inputs and $n$ outputs, each input switch receiving $n$ incoming network lines with $x$ time channels and its $m$ outputs being connected in parallel to respective inputs of $m$ intermediate switches in each network, each output switch having $n$ outgoing network lines with $x$ time channels, the $m$ inputs of each output switch being connected to the outputs of the $m$ intermediate switches, the $p$ inputs and $q$ outputs of each intermediate switch being thus respectively connected to the $p$ input switches and the $q$ output switches so that each network thus determined comprises $n^2$ incoming lines and $n^2$ outgoing lines, whereby a connection is possible between any time channel of the $n^2$ outgoing network lines and any time channel of the $n^2$ outgoing network lines, the traffic being provided without blocking or with blocking depending on the number $m$ of switches of the intermediate stage.

5. A time division multiplex connection system according to claim 4, wherein the intermediate switches comprise the same number of inputs and outputs ($p = q$), the connection system being thus symmetrical.

6. A time division multiplex connection system according to claim 2, with each network comprising three stages, the input stage comprising n switches with $n$ inputs and $(2n - 1)$ outputs, the intermediate stage comprising $2(2n-1)$ switches with $n$ inputs and $n$ outputs and the output stage comprising $n$ switches with $(2n-1)$ inputs and n outputs, some of said time division multiplex connections existing between the $(2n - 1)$ outputs of each input switch and the inputs of $(2n - 1)$ intermediate switches in each network and other of said time division multiplex connections existing between the $(2n - 1)$ inputs of each output switch and $(2n-1)$ intermediate switches in each network so as to form a time connection network without blocking having $n^2$ incoming network lines and $n^2$ network lines.

7. A time division multiplex connection system according to claim 1, wherein each time switch at least comprises a plurality of input registers equal in number to the number of incoming network lines to the switch, a plurality of output registers equal in number to the outgoing network lines from the switch, each incoming and outgoing network line comprising 32 time channels, a buffer memory operatively associated with the incoming network lines and constituted by as many addressable memory blocks as there are incoming network lines to store data therefrom, each block comprising 32 words of $y$ bits corresponding to 32 time channels, a control memory operatively associated with the outgoing network lines and constituted by as many memory blocks as there are outgoing network lines, each block comprising 32 words of $z$ bits corresponding to the 32 time channels so that the establishment of a connection between a time channel $ti$ of an input register and a time channel of an output register is effected by means in said control memory writing in the work of $z$ control memory bits associated with the time channel $tj$ of the output register allocated to the $n$th outgoing network line the address of the buffer memory word associated with the time channel $ti$ of the input register allocated to the $m$th incoming network line, and wherein each intermediate stage switch further includes a second group of input registers equal in number to the number of incoming lines from the input stage of one network and a second group of addressable memory blocks in said buffer memory thereof corresponding to said second group of input registers, said control memory in each intermediate stage switch having a storage facility for an additional binary element per address word serving to switch said address of one of said second group of input registers.

8. A time division multiplex connection system as defined in claim 1, wherein each time switch comprises a plurality of input regisers equal in number to the number of incoming network lines to the switch, a plurality of output registers equal in number to the outgoing network lines from the switch, a buffer memory including an individual memory portion for each input register having a plurality of time channels equal in number to the time channels provided by each incoming network line, a control memory having an addressable memory block corresponding to each output register, each memory block having a plurality of time channels equal in number to the time channels provided by each outgoing network line, said control memory including means for transferring data in one time channel in said buffer memory to a different time channel of one of said outgoing network lines in accordance with the address of the input register and time channel thereof stored in the memory block corresponding to the required output register and the time channel of the memory block corresponding to the time channel of the outgoing network line to be used, and wherein each intermediate stage switch further includes a second group of input registers equal in number to the number of incoming lines from the input stage of one network and a second group of addressable memory blocks in said buffer memory thereof corresponding to said second group of input registers, said control memory in each intermediate stage switch having a storage facility for an additional binary element per address word serving to switch said address of one of said second group of input registers.

* * * * *